United States Patent
Oberle et al.

(10) Patent No.: US 9,194,481 B2
(45) Date of Patent: *Nov. 24, 2015

(54) ADJUSTMENT DRIVE HAVING INTEGRATED ADDITIONAL FUNCTIONS

(75) Inventors: Hans-Juergen Oberle, Rastatt (DE); Wilhelm Braun, Buehl (DE); Roland Braun, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 502 days.

This patent is subject to a terminal disclaimer.

(21) Appl. No.: 13/520,322

(22) PCT Filed: Nov. 3, 2010

(86) PCT No.: PCT/EP2010/066676
§ 371 (c)(1),
(2), (4) Date: Oct. 1, 2012

(87) PCT Pub. No.: WO2011/079981
PCT Pub. Date: Jul. 7, 2011

(65) Prior Publication Data
US 2013/0029801 A1    Jan. 31, 2013

(30) Foreign Application Priority Data
Dec. 30, 2009 (DE) .......................... 10 2009 055 412

(51) Int. Cl.
*F16H 37/04* (2006.01)
*F16H 1/02* (2006.01)
*F16H 1/16* (2006.01)
(Continued)

(52) U.S. Cl.
CPC ............ *F16H 57/033* (2013.01); *F16H 37/041* (2013.01); *F16H 57/039* (2013.01); *Y10T 74/19* (2015.01); *Y10T 74/19633* (2015.01); *Y10T 74/19679* (2015.01); *Y10T 74/19828* (2015.01)

(58) Field of Classification Search
CPC ... F16H 57/033; F16H 57/037; F16H 57/039; F16H 37/041; Y10T 74/19633; Y10T 74/19; Y10T 74/19679; Y10T 74/19828
USPC .......... 475/343, 228, 229; 74/89.14, 745, 425
See application file for complete search history.

(56) References Cited

U.S. PATENT DOCUMENTS

| | | | |
|---|---|---|---|
| 2,039,526 A * | 5/1936 | Fennell et al. | 310/40 R |
| 4,041,807 A | 8/1977 | Herr | |
| 4,900,690 A | 2/1990 | Tamura | |

(Continued)

FOREIGN PATENT DOCUMENTS

| | | |
|---|---|---|
| AU | 2008264221 | 7/2009 |
| CN | 101356073 | 1/2009 |

(Continued)

OTHER PUBLICATIONS

PCT/EP2010/066676 International Search Report dated Jan. 31, 2011 (English Translation and Original, 6 pages).

*Primary Examiner* — Edwin A Young
*Assistant Examiner* — Colby M Hansen
(74) *Attorney, Agent, or Firm* — Michael Best & Friedrich LLP

(57) ABSTRACT

The present invention relates to an adjustment drive, in particular for a vehicle, for driving a component, comprising a drive unit having comprises a first output shaft, wherein an output unit or an intermediate unit, which is disposed between the input unit and the output unit, can be adapted in a modular manner to the first output shaft.

12 Claims, 1 Drawing Sheet

(51) Int. Cl.
*F16H 57/033* (2012.01)
*F16H 57/039* (2012.01)

(56) References Cited

U.S. PATENT DOCUMENTS

| | | | | |
|---|---|---|---|---|
| 5,220,852 | A * | 6/1993 | Shinoda et al. | 74/606 R |
| 5,345,834 | A * | 9/1994 | Hayashi | 74/421 A |
| 5,570,606 | A | 11/1996 | Irie | |
| 5,682,799 | A * | 11/1997 | Dimov | 74/606 R |
| 6,234,037 | B1 * | 5/2001 | Zimmer | 74/421 A |
| 6,508,140 | B2 * | 1/2003 | Zaps | 74/411 |
| 6,862,946 | B2 * | 3/2005 | Sumita et al. | 74/421 A |
| 7,040,473 | B2 * | 5/2006 | Schachtl et al. | 192/84.91 |
| 7,225,698 | B2 * | 6/2007 | Bouche | 74/425 |
| 2001/0013714 | A1 | 8/2001 | Ochiai et al. | |
| 2004/0097318 | A1 * | 5/2004 | Greuel et al. | 475/149 |
| 2012/0187710 | A1 * | 7/2012 | Oberle et al. | 296/57.1 |
| 2013/0199321 | A1 * | 8/2013 | Oberle et al. | 74/89.14 |

FOREIGN PATENT DOCUMENTS

| | | |
|---|---|---|
| DE | 10251499 | 5/2004 |
| EP | 0440819 | 8/1991 |
| GB | 2185085 | 7/1987 |

* cited by examiner

ADJUSTMENT DRIVE HAVING INTEGRATED ADDITIONAL FUNCTIONS

BACKGROUND OF THE INVENTION

The present invention relates to an adjustment drive, in particular for a vehicle, for driving a component, having an input unit, which comprises a first output shaft.

In vehicles, especially in motor vehicles, the operation of vehicle components and convenience for the occupants are increasingly being simplified by automating the vehicle components. For this purpose, there is a need for adjustment drives which can be used for adjustment tasks, locking and unlocking tasks and positioning tasks, even in inaccessible areas of the vehicle. Owing to the small amount of installation space available, these adjustment drives should be as small as possible.

In order to satisfy the requirements of customers in the vehicle industry, especially in the automotive industry, the components of vehicles are adapted to specific models and, in some cases, also to specific customer requirements within the same model range. At the same time, it is important to minimize the number of components within vehicle production to make stock holding as inexpensive as possible and ensure that component numbers are not too large. This makes the components economical to produce.

To adjust components, e.g. a tailgate, a sliding roof or, in particular, to adjust the height or tilt of a seat, there is often a need for adjustment drives which have a large reduction and transmit a high torque. In general, planetary gears are used for this purpose, and often a plurality of gear stages are arranged in series. However, the disadvantage with this arrangement is the not inconsiderable rolling contact noise.

For any sensors which may be required, in particular a position detection system, the conventional practice is to provide a volume in adjustment drives into which the sensor system can be integrated when required, in particular as a plug-in board. As a result, the volume of the adjustment drive when the sensor system is not required is unnecessarily large. On the other hand, the installation space available in the vehicle is very limited.

SUMMARY OF THE INVENTION

It is the object of the invention to provide an adjustment drive for driving a component which transmits a high torque, is of very compact construction, can be used in inaccessible areas, can be used in many different ways, in particular for different vehicle models or for different requirements on the same vehicle or vehicle model and, in particular, for positioning tasks, which is quiet, can be produced at low cost and can be assembled easily.

The object is achieved with an adjustment drive, in particular for a vehicle, which is provided for driving a component, having an input unit, which comprises a first output shaft, to which an output unit or an intermediate unit, which is arranged between the input unit and the output unit, can be adapted in a modular manner.

The adjustment drive according to the invention can therefore be employed in three embodiments, either without an output and intermediate unit, or with an adapted output unit, or with an adapted output and intermediate unit. The adjustment drive can therefore be used for various adjustment tasks, depending on requirements, in particular in the same vehicle or the same vehicle model range or in different vehicles.

Moreover, the intermediate unit can be adapted in a modular manner between the input unit and the output unit. This enables the input unit, the intermediate unit and the output unit to be manufactured in a modular manner. As a result, the respective numbers of these units can be adapted to requirements. This keeps the cost of stock holding to a reasonable level.

The intermediate unit preferably has at least one additional function, in particular a sensor, a slipping clutch, an overload safeguard, a speed-increasing stage etc. In another preferred option, the intermediate unit has a plurality of additional functions. Adapting the intermediate unit to the input unit and between the input and the output unit makes it possible to integrate a large number of different tasks and functions into the adjustment drive. At the same time, the installation space required by the adjustment drive is always optimum since it increases in size only in the case where the output unit or the intermediate unit and the output unit is/are adapted, by the volume required by said units.

In a particularly preferred embodiment, the intermediate unit has at least one sensor for position detection. Conventional sensors, e.g. incremental encoders, absolute encoders, resolvers etc. can be used as sensors for position detection. The arrangement of the intermediate unit ahead of the output unit is particularly advantageous here since the transmission ratio of the output unit can be selected in such a way that it can offer sufficient resolution with respect to the positioning signals. Moreover, the quality of the signals is impaired only by the backlash of the output unit, and the backlash of the input unit has no effect on position detection.

In a preferred embodiment, the input unit comprises a first worm gear and a second worm gear. In this case, the first worm gear and the second worm gear are preferably arranged in series as a double worm gear. The combination of two worm gears allows a very large speed reduction in a very small installation space.

An input shaft, which drives the input unit, the first output shaft of the input unit and a second output shaft of the output unit are preferably arranged coaxially. In this case, the second output shaft is preferably provided to drive the component.

In order to achieve this, the input unit preferably comprises a spur gear. The spur gear likewise preferably comprises the first output shaft. Moreover, the spur gear preferably comprises a spur wheel, which is arranged on the first output shaft. Moreover, the spur gear preferably comprises a gearwheel which is arranged on an intermediate shaft, in particular an intermediate shaft arranged parallel to the axis of the first input shaft, and which is in engagement with the spur wheel.

In another preferred embodiment, the output unit comprises a planetary gear. Depending on requirements, however, some other gear can also be used for the output unit, especially if a smaller reduction is required. The planetary gear preferably has a sun wheel, which can be adapted to the first output shaft. This arrangement allows a large reduction and the coaxial arrangement of the first output shaft and of the second output shaft.

As another preferred option, the intermediate unit can be adapted to the first output shaft, wherein the sun wheel of the planetary gear of the output unit can be adapted to the intermediate unit. This makes it possible to arrange the intermediate unit between the input unit and the output unit.

The input unit is preferably drivable by means of a drive. An electric motor is preferably used as a drive. However, it is also possible to use some other drive provided for performing mechanical work.

The input unit is preferably arranged in a first housing part, with the intermediate unit being arranged in a second housing part and the output unit being arranged in a third housing part. The parts of the gear associated with each unit are mounted in the housing parts and are protected against the ingress of dirt and moisture by the housing parts.

The output is preferably mounted on the first housing part.

The adjustment drive according to the invention is very versatile since it can be adapted in a very flexible manner to the requirements demanded since it is always of optimally compact construction and since sensors and/or other additional functions can optionally be integrated into it.

BRIEF DESCRIPTION OF THE DRAWING

The invention is described below with reference to figures. The figures are purely illustrative and do not restrict the general inventive concept.

DETAILED DESCRIPTION

Figure 1:
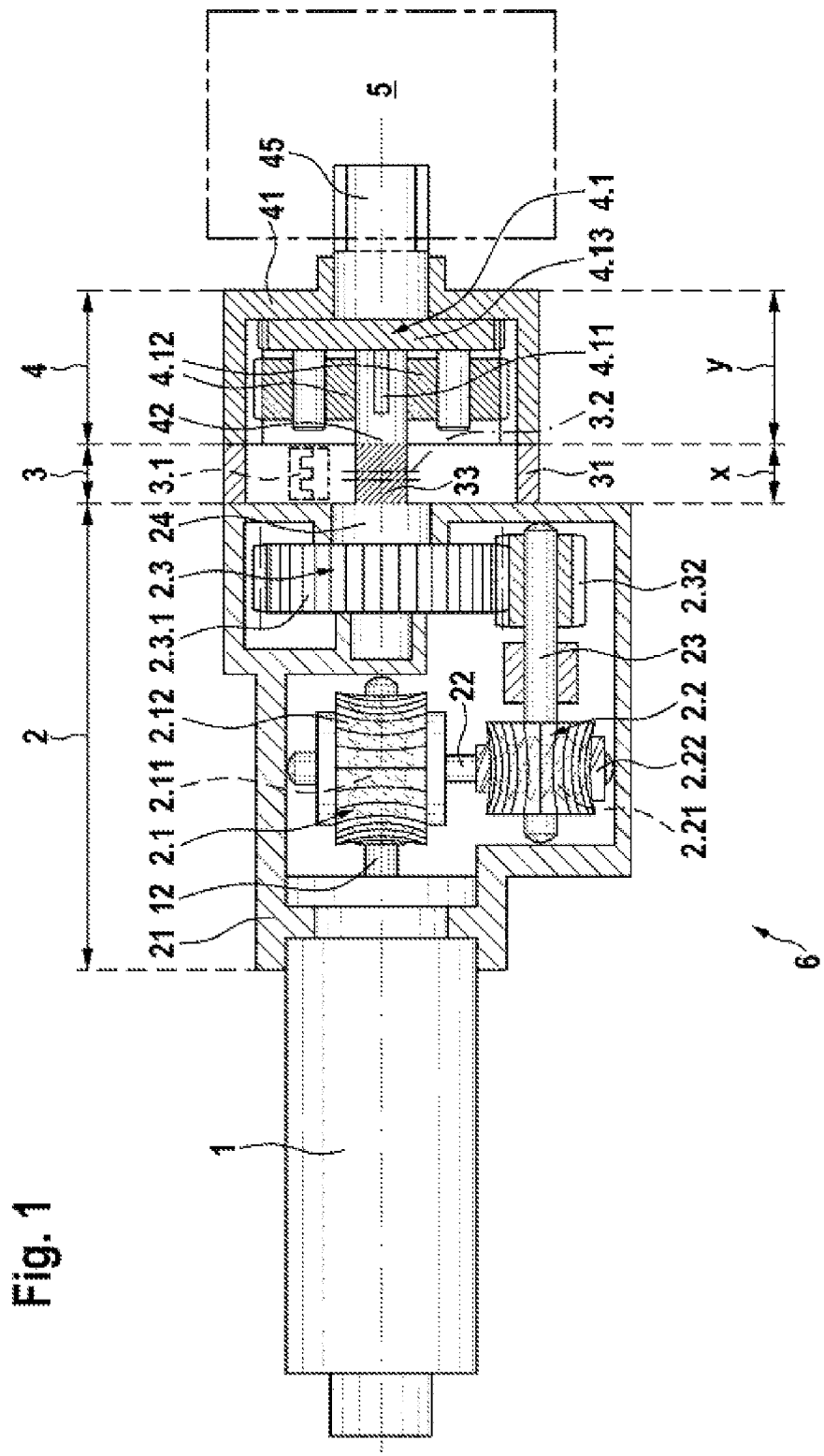
FIG. 1 shows an adjustment drive according to the invention schematically.

FIG. 1 shows an adjustment drive 6 according to the invention schematically. The adjustment drive 6 comprises an input unit 2, which has an input shaft 12 that can be driven by means of an electric motor 1.

Arranged on the input shaft 12 is a first worm 2.11 of a first worm gear 2.1, which interacts with a first worm gear wheel 2.12 of the first worm gear 2.1. The first worm gear wheel 2.12 is arranged on a worm shaft 22, which is arranged substantially transversely to the input shaft 12.

Arranged on the worm shaft 22 is a second worm 2.21 of a second worm gear 2.2, which interacts with a second worm gear wheel 2.22 of the second worm gear 2.2, which is arranged on an intermediate shaft 23. The intermediate shaft 23 is arranged substantially transversely to the worm shaft 22 and hence substantially parallel to the axis of the input shaft 12.

The first worm gear 2.1 and the second worm gear 2.2 are therefore arranged in series to give a double worm gear.

When the input shaft 12 is driven, the worm shaft 22 is driven via the first worm gear 2.1 and, for its part, drives the intermediate shaft 23 via the second worm gear 2.2.

Arranged on the intermediate shaft 23 is a gearwheel 2.32, which interacts with a spur wheel 2.31 and, together with the latter, forms a spur gear 2.3. The spur wheel 2.31 is arranged on a first output shaft 24 of the input unit 2. This arrangement makes it possible to arrange the first output shaft 24 substantially coaxially with the input shaft 12. When the intermediate shaft 23 is driven, gearwheel 2.32 is driven, said gearwheel being at least partially in engagement with the spur wheel 2.31 of the spur gear 2.3, and, as a result, the spur wheel 2.31 is driven. As a result, the first output shaft 24 is driven.

In the embodiment of the adjustment drive 6 illustrated here, an intermediate unit 3 is adapted to the first output shaft 24. The intermediate unit 3 comprises a sensor 3.1 and another additional function 3.2.

A person skilled in the art will understand that the intermediate unit 3 has a connecting shaft 33, which can be adapted at the end facing the input unit 2 to the first output shaft 24 of the input unit 2, and the output unit 4 can be adapted at the end thereof which is remote from the input unit 2. Here, the connecting shaft 33 is indicated by hatching. In the adapted state, it can be driven by the first output shaft 24 of the input unit 2. A person skilled in the art will understand that, on the one hand, it can be of integral design, depending on the requirements of the intermediate unit 3. However, it can also comprise additional functions 3.2, such as a slipping clutch or a gear, which require manufacture in several parts.

In this case, the components of the connecting shaft 33 are arranged substantially coaxially.

The adaptation of the intermediate unit 3 and of the output unit 4 increases the volume of the adjustment drive 6 by the volume of the intermediate unit 3 and the volume of the output unit 4. In cross section, the dimensions of the output unit 4 and the dimensions of the intermediate unit 3 preferably do not exceed the dimensions of the input unit 2, and therefore it is, in particular, the length of the adjustment drive 6 which is increased, by the length y of the output unit 4 plus the length x of the intermediate unit 3.

The output unit 4 of the adjustment drive 6 has a planetary gear 4.1. The planetary gear 4.1 comprises a sun wheel 4.11, which can be adapted to the intermediate shaft 33 of the intermediate unit 3 and, in the adapted state, can be driven by the latter. The planetary gear 4.1 comprises planet wheels 4.12, which are connected to one another by means of a planet carrier 4.13. A second output shaft 45 is arranged on the planet carrier 4.13. The second output shaft 45 is arranged coaxially with the sun wheel 4.11 and with the first output shaft 24.

When the sun wheel 4.11 is driven, the planet wheels 4.12 are driven and, as a result, the planet carrier 4.13 rotates. As a result, the second output shaft 45, which is arranged on the planet carrier 4.13, rotates.

The sun wheel 4.11 of the planetary gear 4.1 of the output unit 4 can also be adapted directly to the first output shaft 24 if the functions integrated into the intermediate unit 3 are not required. The volume of the adjustment drive 6 is then enlarged only by the volume of the output unit 4. Since, in cross section, the dimensions of the output unit 4 preferably do not exceed the dimensions of the input unit 2, the length of the adjustment drive 6 is in this case increased only by the length y of the output unit 4.

In addition, the adjustment drive 6 can also be used to drive a component 5 without the intermediate unit 3 and the output unit 4 if the requirements provided by the intermediate unit 3 and the output unit 4 are not demanded. Thus, both the first output shaft 24 and the second output shaft 45 can be used to drive the component 5.

A tailgate is preferably provided as component 5. However, the adjustment drive 6 is also suitable for adjusting seats, sliding roofs or similar adjustable units.

The input unit 2 has a first housing part 21, the intermediate unit 3 has a second housing part 31 and the output unit 4 has a third housing part 41, in which their respective gear components 2.1-2.3, 3.1, 4.1 are mounted. The electric motor 1 is furthermore mounted on the first housing part 21. The housing parts 21, 31, 41 are joined together, preferably directly, during adaptation, thus protecting the gear components 2.1-2.3, 3.1, 4.1 from dirt and liquids.

The invention claimed is:

1. An adjustment drive (6) for driving a component (5), the adjustment drive comprising an input unit (2) with an input shaft, a first worm gear, a second worm gear, a first output shaft (24), and a spur gear for driving the first output shaft, the first worm gear and the second worm gear arranged in series to form a double worm gear, the adjustment drive further including an output unit having a planetary gear and a second output shaft for driving the component, wherein the input unit and the output unit are configured to receive an intermediate unit (3) therebetween, and wherein each of the output unit and the intermediate unit is configured to be directly coupled to the first output shaft (24), and further wherein the input shaft, the first output shaft, and the second output shaft are coaxially aligned.

2. The adjustment drive (6) as claimed in claim 1, characterized in that the intermediate unit (3) has at least one sensor (3.1) for position detection.

3. The adjustment drive (6) as claimed in claim 2, characterized in that the spur gear (2.3) comprises a spur wheel (2.31), which is arranged on the first output shaft (24).

4. The adjustment drive (6) as claimed in claim 3, characterized in that the planetary gear (4.1) comprises a sun wheel (4.11), configured to be coupled to the first output shaft (24) of the input unit (2).

5. The adjustment drive (6) as claimed in claim 4, characterized in that the sun wheel (4.11) is configured to be coupled to the intermediate unit (3).

6. The adjustment drive (6) as claimed in claim 5, characterized in that the adjustment drive can be driven by means of a drive (1).

7. The adjustment drive (6) as claimed in claim 1, characterized in that the spur gear (2.3) comprises a spur wheel (2.31), which is arranged on the first output shaft (24).

8. The adjustment drive (6) as claimed in claim 1, characterized in that the planetary gear (4.1) comprises a sun wheel (4.11), configured to be coupled to the first output shaft (24) of the input unit (2).

9. The adjustment drive (6) as claimed in claim 8, characterized in that the sun wheel (4.11) is configured to be coupled to the intermediate unit (3).

10. The adjustment drive (6) as claimed in claim 1, characterized in that the adjustment drive can be driven by means of a drive (1).

11. The adjustment drive (6) as claimed in claim 1, characterized in that the intermediate unit (3) is at least one of a sensor, a slipping clutch, an overload safeguard, a speed-increasing stage and a reduction stage.

12. An adjustment drive for driving a component, the adjustment drive comprising:
   an input unit having
       an input shaft,
       a first worm gear,
       a second worm gear,
       a first output shaft, and
       a spur gear for driving the first output shaft, the first worm gear and the second worm gear arranged in series to form a double worm gear;
   an output unit having a planetary gear and a second output shaft for driving the component; and
   an intermediate unit positioned between the input unit and the output unit and having a connecting shaft, wherein the input shaft, the first output shaft, the second output shaft, and the connecting shaft are coaxially aligned in operation.

* * * * *